Oct. 7, 1958 | G. TAMBURELLI | 2,855,575

NEGATIVE IMPEDANCE AMPLIFIER WITH SEPARATE INPUT AND OUTPUT PARTICULARLY FOR TELEPHONE SYSTEMS

Filed July 30, 1956 | 3 Sheets-Sheet 1

INVENTOR

Giovanni Tamburelli

BY Stevens, Davis, Miller & Mosher

ATTORNEYS

Oct. 7, 1958 G. TAMBURELLI 2,855,575

NEGATIVE IMPEDANCE AMPLIFIER WITH SEPARATE INPUT AND OUTPUT PARTICULARLY FOR TELEPHONE SYSTEMS

Filed July 30, 1956 3 Sheets-Sheet 2

INVENTOR

Giovanni Tamburelli

BY Stevens, Davis, Miller & Mosher

ATTORNEYS

Oct. 7, 1958

G. TAMBURELLI 2,855,575

NEGATIVE IMPEDANCE AMPLIFIER WITH SEPARATE INPUT AND OUTPUT PARTICULARLY FOR TELEPHONE SYSTEMS

Filed July 30, 1956

3 Sheets-Sheet 3

INVENTOR

Giovanni Tamburelli

BY Stevens, Davis, Miller & Mosher

ATTORNEYS

United States Patent Office 2,855,575

Patented Oct. 7, 1958

2,855,575

NEGATIVE IMPEDANCE AMPLIFIER WITH SEPARATE INPUT AND OUTPUT PARTICULARLY FOR TELEPHONE SYSTEMS

Giovanni Tamburelli, Turin, Italy, assignor to Societa Telefonica Interregionale Piemontese e Lombarda, Turin, Italy Application July 30, 1956, Serial No. 601,080

Claims priority, application Italy August 10, 1955

10 Claims. (Cl. 333—80)

The present invention relates to a negative impedance amplifier with separate input and output, particularly for telephone systems and the like.

As is well known, negative impedance amplifiers are used in telephone lines. These amplifiers generally have an identical input and output. In order to obtain greater simplicity of construction, greater stability in operation, and greater dependability in operation, the present invention now provides an amplifier with separate input and output.

The negative impedance transformers which are now on sale do not completely satisfy the technical requirements of the amplification in telephone lines. With reference first to stable amplifiers with open terminals, their drawbacks are substantially two:

(1) They require a coupling with the line which, for symmetry and balancing purposes, must be accomplished by means of a single transformer. This transformer constitutes an impedance, on which the negative impedance of the amplifier is closed and which tends to start up oscillations. Indeed, a transformer has always an impedance equal to zero at a high frequency and therefore low values of impedance at frequencies even remarkably apart from said zero of impedance. As a result it is found that these amplifiers with particular equalizer circuits start up oscillations even when the circuit is open and many times the maximum gains obtainable are substantially less than the maximum theoretical ones. Sometimes, in order to have a suitable margin of stability, it becomes necessary to accept insignificant gains. Moreover, the line transformer must have a high impedance at audio-frequencies also during the passage of the signal currents and therefore it is not permitted to have for such currents any saturation phenomenon, otherwise oscillation would occur, and as a consequence the call currents also will meet a very high impedance in passing through the amplifier and the call voltage will undergo a conspicuous attenuation.

(2) In order to have a sufficiently small non linear distortion and an adequate stability of the gain, it is necessary to use two thermionic tubes or a double thermionic tube or, in any event, two amplifier members such as two transistors disposed in cascade or in push-pull. This leads to a high increase in the cost both in the purchase of the equipment and, particularly when thermionic tubes are employed, in operation. Moreover, the cost is higher due the increased number of electric parameters which are introduced in the amplifier.

With reference to the stable amplifier with short circuited terminals of the prior art, this amplifier besides being subjected to said inconvenience (2), has the following other two inconveniences:

(3) The amplifier is coupled to the line through two block condensers, disposed in series with the negative impedance of the amplifier itself, which serve to increase the low frequency impedance, adversely affecting in this way the stability of said amplifier. This amplifier, in order to be stable, must greatly reduce its gain at low frequencies so that in many cases it becomes impossible to have satisfactory circuits.

(4) The amplifier is unbalanced and therefore it is practically impossible to insert it directly shunted in a telephone line even if connected to an $E_2$ amplifier of Western Electric Company without adding two coupling repeaters, otherwise the transmission characteristics of the telephone line would be completely changed.

The theoretical embodiment according to this invention removes completely said inconveniences and establishes a remarkable improvement. The stable amplifier with open circuit is coupled to the line through two separate transformers so that the negative impedance is closed only on the line impedance. It is therefore possible to obtain the maximum theoretical gain, and a starting up of oscillations with open circuit is absolutely avoided. Moreover, the two transformers may have a low inductance, since this parameter, for transmission purposes, can easily be reduced by means of a condenser in series with the equalizer network and in general this reduction is not necessary as it produces a smaller gain in accordance with the smaller attenuation of the cable at low frequencies and therefore the transformer construction is extremely simplified. Moreover, both because the transformers have a low inductance and then also a low resistance, and because they can easily be saturated, an extremely reduced attenuation of the signal currents can be obtained. Particularly for the circuits through which a direct current does not pass during the call, low cost ferroxcube cores can be used. In the practice, for the above reasons, the use of two transformers is not, in general, more expensive than the use of a single transformer.

As to the drawback (2), in order to obtain a high stability of the gain and a reduced non linear distortion a technical embodiment of this invention requires the use of a single triode tube since a high voltage gain can be obtained by means of one of the two transformers so that the triode valve has only the function of gaining power and therefore is allowed to have a very high negative voltage feedback such as the one corresponding to a cathode output. Moveover, the transformer by means of which the output of the transformer is coupled to the line can even have a reverse ratio lowering the voltage so that the output resistance brought on the line is highly reduced, thus assuring an improved operational stability and an improved operation of the amplifier as an impedance inverter.

Moreover, it will be noted in this new amplifier a complete absence of any electrical parameter excepting the ones relating to the impedance which is to be inverted in sign, and in particular the absence of parameters under anode voltages.

Also, the stable amplifier with short circuited terminals according to this invention is obtained by means of two separate transformers. In it said inconvenience (3) is completely avoided, the block condensers for the signal currents being two, each of them at the center of the two output windings of the two transformers. In effect, the two condensers instead of being in series with the whole negative impedance are in series with some component parts and therefore serve to render stable the operation of the negative impedance at low frequencies instead of rendering it unstable. Besides, the attenuation that these two condensers produce can be completely overcome, at least beginning from a frequency of 300 cps., by the inductances of the transformers.

The drawback (4) is obviously overcome by making the two line windings of the two transformers in a balanced manner. As to said drawback (2), it is true what has been pointed out for the stable amplifier with open terminals, except in that the stable amplifier with short circuited terminals according to this invention has a very high impedance at the tube output since it has a very high negative current feedback.

The amplifier in accordance with the invention consists essentially of an input transformer, an output transformer, a single thermionic tube and an impedance arranged in the grid circuit.

The amplifier in accordance with the invention by the use of a suitable four-terminal network inserted in the input circuit, makes it possible furthermore to convert a transmission function into an impedance function.

The amplifier which is the subject matter of the present invention can be made in three distinct forms, namely:

(1) A negative impedance amplifier with separate input and output connected in series with each other, hereinafter called type "N";

(2) A negative impedance amplifier with separate input and output connected together in parallel, hereinafter called type "NP";

(3) An amplifier resulting from a combination of types N and NP, hereinafter called "NH."

The amplifier in accordance with the invention will now be described separately with respect to its three fundamental types with reference to the attached drawings in which.

Figure 1:
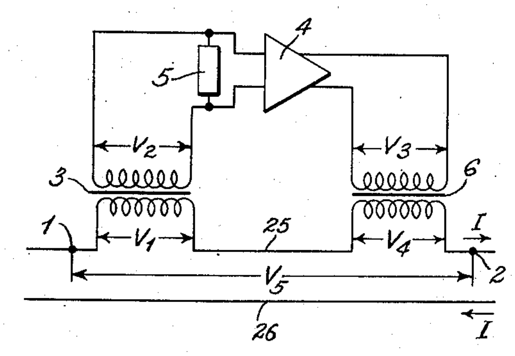
Figure 1 is a basic diagram of a type N amplifier.

In the following detailed description of the invention like elements performing like function are given the same reference numeral in the separate modifications. But please note that elements in the NP type amplifiers which are the same as and perform the same function as the respective elements in the N type amplifier are given the same reference number as the elements have in the N type but with a prime so that they can be more readily distinguished in Figure 12.

The basic diagram of the type N amplifier is shown in Figure 1. Differing from the type $E_1$ amplifier of the Western Electric Co. which has coinciding input and output, the type N amplifier has its input and output completely separate and connected together in series. As shown in Figure 1, the type N amplifier in the case of telephone circuits is generally inserted in series with one of the lines 25 and 26.

The amplifier as can be seen consists of a two-terminal circuit, the terminals of which in Figure 1 are indicated as 1 and 2 and it is shown that when a particular condition occurs this two-terminal network will have a negative impedance.

For the purpose of the explanation let us assume that the transformers are perfect and ideal—and this is always assumed in this specification unless otherwise indicated. Let us consider a given current I passing over the line, and let us indicate by $n_1$ the transformer ratio:

$$n_1=\frac{V_2}{V_1}$$

of the transformer 3 (Figure 1). The value of impedance 5 is $Z_n$. The current I passing through the primary of transformer 3, assuming the impedance of the input of the amplifier 4 to be infinite, therefore meets the impedance $Z_n/n_1^2$ and therefore the voltages between the terminals of the primary of transformer 3 is:

$$V_1=\frac{Z_n}{n_1^2}I$$

while the voltage between the secondary terminals is $$V_2=\frac{Z_n}{n_1^2}n_1I=\frac{Z_n}{n_1}I$$

This voltage is applied to the grid of the amplifier 4 and appears amplified, reduced, or unchanged at the output terminals of the amplifier 4. The output from the amplifier 4 is a voltage represented by $V_3$ and is applied to the primary of transformer 6. Indicating the output from the secondary of transformer 6 as $V_4$ and indicating the amplification factor of amplifier 4 by A whereby $A=V_3/V_2$ and by $n_2$ the ratio: $n_2=V_3/V_4$ (see Figure 1) we have:

$$V_4=\frac{1}{n_2}AV_2=A\frac{Z_n}{n_1n_2}I$$

It should be pointed out that $V_4$ is the voltage which would appear at the secondary terminals of 6 under no load conditions but that actually between these secondary terminals there appears also added to $V_4$ the voltage drop due to the passage of the current I. From it definition A is dependent neither upon $R_u$ nor upon $Z_n$. This drop, indicating by $R_u$ the sum of the output resistance of amplifier 4 and of the resistance of the primary winding of the transformer 6, in first approximation is equal to:

$$\frac{R_u}{n_2^2}=I$$

The total voltage at the ends of the amplifier is therefore given by the sum of the voltage at the input terminals of the transformer 3, the voltage drop of the current I at the outlet terminals of the transformer 6 and the amplified voltage $V_4$. Connecting the windings of the transformers $T_1$ and $T_4$ in a suitable manner, the result can always be obtained that the voltage $V_4$ is in phase opposition to the other two voltages and employing the negative sign, the total voltage at the ends of the amplifier is $$V_5=\frac{Z_n}{n_1^2}I-A\frac{Z_n}{n_1n_2}I+\frac{R_u}{n_2^2}I$$

Therefore the type N amplifier behaves as an impedance of the value:

$$Z=\frac{V_5}{I}=\frac{Z_n}{n_2^1}-A\frac{Z_n}{n_1n_2}+\frac{R_u}{n_2^2}$$

The impedance of the amplifier consists of two parts, namely a positive part and a negative part; by suitably selecting the parameters, the negative part can be made vary much larger than the positive part so that the impedance is negative as a whole.

For a given impedance which the transformer 3 presents on the line $Z_{n_1}=Z_n/n_1^2$ the impedance of the amplifier is:

$$Z=Z_{n_1}\left(1-\frac{n_1A}{n_2}\right)+\frac{R_u}{n_2^2}$$

Bearing in mind that the term $R_u/n_2^2$ can be rendered substantially negligible by means of a high negative voltage feedback, both by a suitable choice of the ratio $n_2$ and by a low value fixed resistance in series with $Z_n$, it can be seen that the amplifier operates as an impedance converter which multiplies the impedance $Z_n$ by the factor $$1-\frac{n_1}{n_2}A$$

It is obvious that in order for this factor to be negative it is not even indispensable for A to be greater than 1 if only the ratio $n_1/n_2$ is suitably greater than 1, thus making it possible to use even a single tube with a very high degree of negative voltage feedback, such as the one corresponding to the use of a cathode output which renders stable the value of A and besides renders $R_u$ and the importance of its variations highly reduced.

Figure 2:
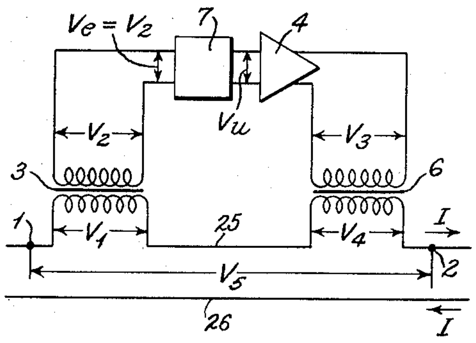
Figure 2 is a basic diagram of a type N amplifier suitable to transform a transmission function into an impedance function.

In Figure 2 a four terminal network 7 is provided instead of the impedance 5. Considering the input impedance to be the same, as impedance 5, namely $Z_n$ and considering the output voltage $V_u$ from the four-terminal network, being related to the input voltage $V_e$ by the transmission function F whereby $V_u=F(V_e)$, the derivation of the impedance of the type N amplifier results in:

$$Z=\frac{Z_n}{n_1^2}-\frac{FAZ_n}{n_1n_2}+\frac{R_u}{n_2^2}$$

This equation can be reduced to:

$$Z=\frac{Z_n}{n_1}\left(\frac{1}{n_1}-\frac{FA}{n_2}\right)+\frac{R_u}{n_2} \qquad (1)$$

For sufficiently high values of $n_1$ so that $$1/n_1-\frac{FA}{n_2}\cong FA/n_2$$

and for a term $R_u/n_2^2$ sufficiently small so as to be able to be neglected, Equation 1 can be written by approximation in the form:

$$Z\cong-\frac{Z_n}{n_1n_2}FA$$

Therefore the negative impedance of the amplifier is equal to the product of a transmission function by an impedance function.

If both A and $Z_n$ of the frequency band transmitted are constant, the amplifier will transform a transmission function of a four-terminal network into an impedance function. It can therefore be understood that by making the four-terminal network with filters and equalizing networks of the conventional type, it is possible to obtain transmission characteristics similar to those of an ordinary two-wire amplifier.

Figure 3:
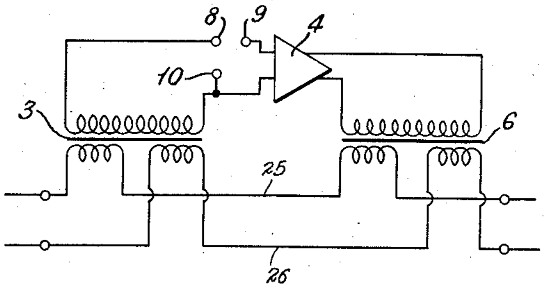
Figure 3 is a basic diagram of a balanced type N amplifier.

The N type amplifier when used in telephone systems must be suitably employed with a balanced circuit. Figure 3 indicates how this may be done by connecting transformers 3 and 6 into both transmission lines 25 and 26. Conventional equalizing and filter networks (not shown) are connected between terminals 8, 9 and 10.

As can be seen from Equation 1, even if amplification factor A is less than 1, a negative impedance can be obtained. This characteristic is extremely important since with a substantial simplification of the circuit, it is possible to use the cathode output for the amplifier. In this way the very high negative feedback makes it possible to obtain extremely great stability.

Figure 4:
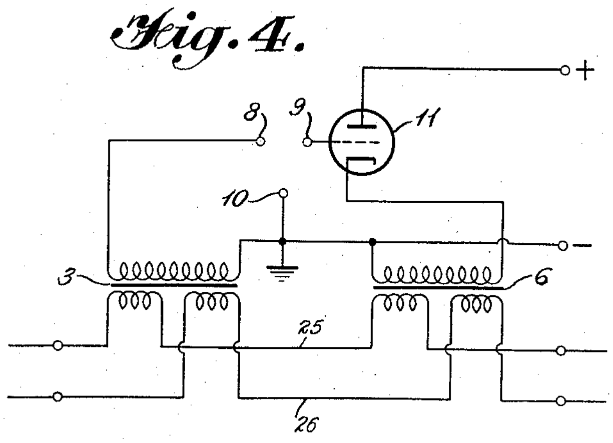
Figure 4 is a basic diagram of a type N amplifier with cathode output.

The basic diagram of the amplifier with a cathode output from the thermionic tube 11 is shown in Figure 4. Again, a conventional equalizing network (not shown) is inserted in the grid circuit between terminals 8, 9 and 10. Naturally, instead of the cathode output a normal transformer output can be used and a common negative feedback can be applied to the tube with the possibility of inserting the equalizing network in the negative feedback circuit rather than in the grid circuit.

For the dimensioning of the amplifier it is advisable above all to select a value of $n_2$ for which the variations of the term $R_u/n_2^2$ which are a result of the lack of stability of the output tube are sufficiently negligible; the value of $n_2$ having been determined, it is necessary to determine the maximum value which $Z_n$ can assume, seeing to it that this value is as high as possible so as to reduce the space taken up by the capacitors, but substantially less than the input impedance of the amplifier 4 and the impedance of the secondary winding of the transformer 3 measured with an open primary in order to reduce the influence of these two impedances on the biasing means. The parameters $Z_n$ and $n_2$ having been fixed, the value $n_1$ which makes it possible to obtain the best gain can be obtained by differentiating the equation for Z with respect to $n_1$ and setting it equal to zero. This results in:

$$n_1=\frac{2n_2}{A}$$

It is however necessary to bear in mind that also for the value of $n_1$ there may exist limits due to the necessity of having a number of primary turns of the transformer 3 which are sufficiently low not to saturate the core due to the passage of the continuous current over the line and in order not to have to use a core of excessive size for such purpose.

Figure 5:
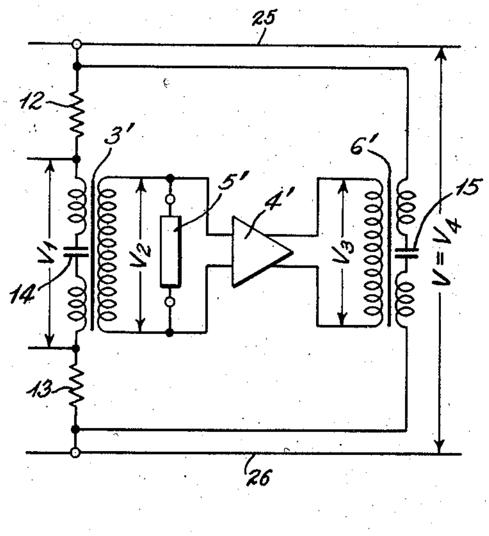
Figure 5 is a basic diagram of a type NP amplifier.

The basic diagram of the type "NP" amplifier is shown in Figure 5. This amplifier, instead of having the input and output connected in series with each line, has them separate and connected across the lines 25 and 26. The insertion of the amplifier in the line also can conveniently be effected in series.

The two resistors 12 and 13 shown in the basic diagram each have a value of $R/2$ and give rise to a total resistance R which must be of sufficiently high value to make the variations of the impedance of the primary of the transformer 3′ negligible as compared to it. The two capacitances 14 and 15 have only the function of blocking the continuous current which might possibly be present on the transmission line and are generally designed so as to have a negligible reactance in the transmission band. In first approximation, the current absorbed by the line which passes through the primary of the transformer 3′ is therefore:

$$I_1=\frac{V}{R}$$

The impedance which the primary of the transformer 3′ presents to the current $I_1$ is $Z_n/n_1^2$ in which $n_1$ is the ratio: $n_1=V_2/V_1$ (see Figure 5) and $Z_n$ is the value of impedance 5′. The voltage at the ends of the primary is therefore:

$$V_1=\frac{Z_n}{n_1^2}I$$

while the voltage at the terminals of the secondary is:

$$V_2=\frac{Z_n}{n_1}I$$

If we indicate by S the mutual conductance of amplifier 4′ taken as ratio between the alternating current which the amplifier gives off with the output terminals short-circuited and the corresponding alternating voltage applied to its input, the current which the amplifier 4′ would give off with the terminals short-circuited is:

$$I_2^1=SV_2=S\frac{Z_n}{n_1}I$$

On the other hand by short-circuiting the secondary terminals of the transformers 6′ the short-circuit current of the secondary winding would be:

$$I_2=n_2SV=n_2S\frac{Z_n}{n_1}I \qquad (2)$$

in which $n_2=V_3/V_4$ (see Figure 5).

The current which the secondary of the transformer 6′ actually gives off to the line is given, on basis of Norton's theorem, by the difference between the short-circuit current of Equation 2 and the current absorbed by the output impedance of the amplifier 4 brought to the terminals of the secondary of the transformer 6′ and considered in parallel with the line. This latter current, indicating by $R_u$ the output impedance of the amplifier, is:

$$I_3=\frac{V}{R_u}n_2^2$$

The total current absorbed by the line is equal to the sum of the three currents $I_1$, $I_2$, $I_3$ of which the current $I_2$, by suitably selecting the direction of connection of the secondary winding of the transformer $T_2$, can always be made negative, namely of opposite sign to the voltage V. By setting forth the negative sign of the current $I_2$, we have as expression for the total current:

$$I=I_1+I_2+I_3=\frac{V}{R}-n_2S\frac{Z_n}{n_1}I+\frac{V}{R_u}n_2^2$$

to which there corresponds a total admittance of the amplifier:

$$Y=\frac{1}{R}-n_2S\frac{Z_n}{n_1R}+\frac{n_2^2}{R_u} \qquad (3)$$

On the contrary it is obvious that by a suitable choice of the parameters the factors $$1/R \text{ and } n_2^2/R_u$$

can be rendered substantially negligible, or in any event, it is possible to compensate said factors by means of a low fixed resistance in series with $Z_n$. In this way the amplifier operates as a converter which converts a given impedance into an admittance equal to said impedance multiplied by a constant and changed in sign.

This admittance, by the suitable selection of the parameters, can be made entirely negative.

Figure 6:
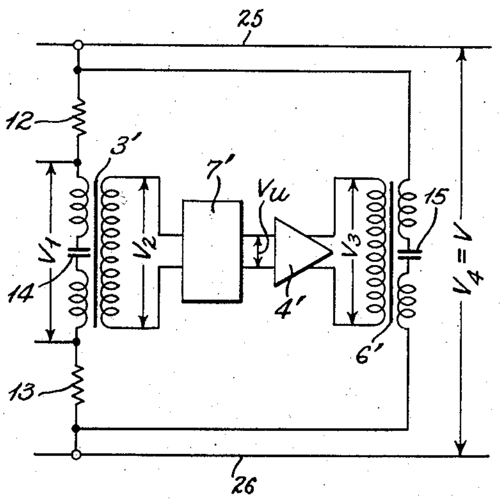
Figure 6 is a basic diagram of a type NP amplifier adapted to transform a transmission function into an impedance function.

If instead of the impedance 5′ there is inserted a four-terminal network 7′ for which the output voltage $V_u$ of the network is related to the input voltage $V_e$ by the transmission function F whereby $V_u=F(V_e)$ since the input voltage is $V_2$ (Figure 6) then $V_u=F(V_2)$. If we proceed in such a manner that the two terms of Equation 3 with a positive sign are negligible, there is obtained the relationship:

$$Y=n_2SF\frac{Z_n}{n_1} \qquad (4)$$

in which $Z_n$ is the input impedance of the four-terminal network. By making both $Z_n$ and S constant, it results from Equation 4 that the NP type amplifier becomes suitable to transform, by means of a proportionality factor, a transmission function into an admittance function.

Figure 7:
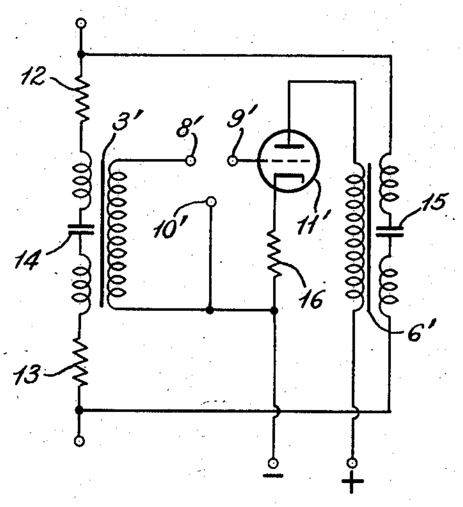
Figure 7 is a basic diagram of a stabilized NP type amplifier with a negative feedback.

In order to obtain a high stability of the gain of the amplifier, it is of course advisable to make use of negative feedback. The most suitable type of negative feedback is current feedback. Let us consider the basic diagram of Figure 7 where the amplifier 4′ consists of a triode 11′ which has current feedback via the resistor 16 having a value of $R_K$. A conventional equalizing network (not shown) is inserted in the grid circuit between terminals 8′, 9′, and 10′.

As is known from the negative feedback theory, the output resistance of the amplifier is:

$$R_u=r_p+uR_K+R_K$$

in which $r_p$ and $u$ are the A.-C. plate resistance and the amplification coefficient of the triode respectively.

The mutual conductance S of the amplifier is therefore:

$$S=\frac{u}{R_u}=\frac{u}{r_p+uR_k+R_K} \qquad (5)$$

If the negative feedback is very high and the amplification coefficient is sufficiently large so that we may write $uR_K>>(Ra+R_K)$, Equation 5 becomes in first approximation:

$$S=\frac{1}{R_K} \qquad (6)$$

and therefore no longer depends on the parameters of the tube. The parameters of the tube however still appear in Equation 3 by means of the term $$n_2^2/R_u$$

which however can be made sufficiently small so that effects of its variations will be practically negligible.

Figure 8:
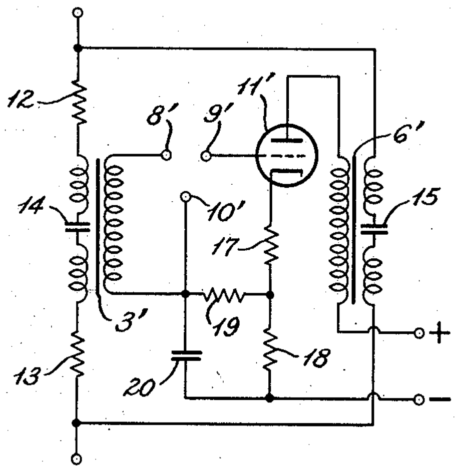
Figure 8 is a basic diagram of a stabilized NP amplifier with negative feedback.

The criterion for the dimensioning of the type NP amplifier consists above all in selecting a tube and the value $R_k$ of resistor 16 in such a maner that Equation 6 is obtained with good approximation. By doing this, however, the resistance $R_K$, since it also serves to stabilize the biasing of the triode, may become too high, in which case it is advisable to apply the well-known circuit artifice shown in Figure 8 in which the network containing resistors 17, 18 and 19, and capacitor 20 are inserted in place of resistor 16.

Thereupon, it is necessary to select $n_2$ in such a manner that the output resistance $$R_u/n_2^2$$

has a sufficiently high value to make its instability resulting from the parameters of the tube practically negligible. The value of $n_2$ having been established, the value of $n_1$ which makes it possible to obtain maximum gain results from the formula:

$$n_1=\tfrac{1}{2}Z_nn_2S \qquad (7)$$

in which $Z_n$ is selected so as to make the effects of the input impedance of the amplifier 4′ and the impedance of the secondary of the transformer 3′ negligible.

The value of $n_1$ given by Equation 7 is generally very high and it must be borne in mind that too high a value of $n_1$ makes it necessary to make the value R of resistors 12 and 13 too low and therefore the current absorption through resistors 12 and 13 may become too great with a consequent overloading of the amplifier. Finally, the capacitor 15 must have as small as possible a capacitance value compatible with the above-indicated condition of imparting to it a very small resistance in the frequency band transmitted, in order not to excessively deform the pulses transmitted on the lines 25 and 26.

Figure 9:
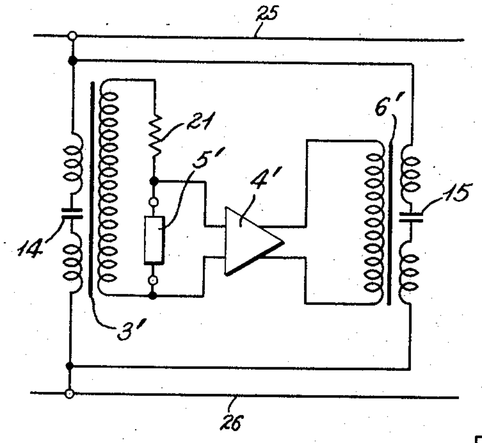
Figure 9 is a basic diagram of a type NP amplifier with a voltage divider on the secondary of the input amplifier.

It is also possible to insert instead of the two resistances 12 and 13 in series in the primary of the transformer, a single resistance 21 in series in the secondary, in accordance with the basic diagram shown in Figure 9. This arrangement has however the disadvantage of requiring windings of a high number of turns for transformer 3′.

By arranging the type N amplifier in series and the type NP amplifier in parallel on the transmission line there is obtained a four-terminal network, called type "NH," which has the great advantage of having the image impedances positive. The most suitable arrangement is first of all to make the type N amplifier symmetrical as well as balanced and secondly to insert the type NP amplifier on the two centers, taken between the two wires of the line, of the type N amplifier.

Figures 10, 12:
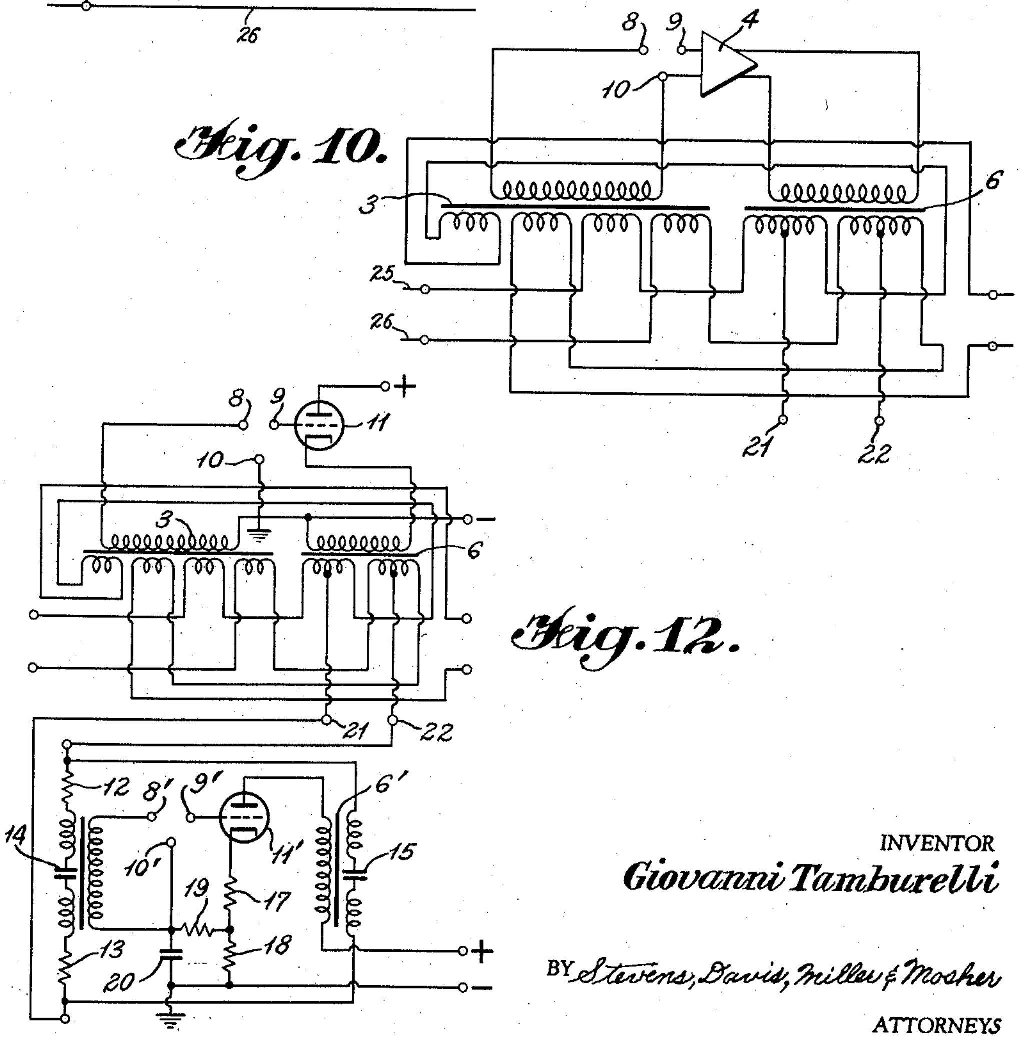
Figure 10 is a basic diagram of a balanced symmetrical type N amplifier.
Figure 12 is the diagram of one example of a type NH amplifier.

The diagram of the symmetrical and balanced type N amplifier is shown in Figure 10; the NP amplifier must be inserted on the two centers of the two secondary semi-windings of the output transformer, marked 21 and 22 in Figure 10.

Figure 11:
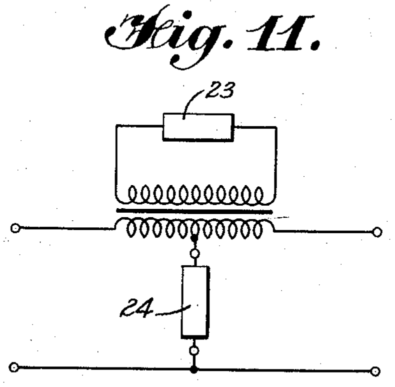
Figure 11 is the diagram of an equivalent circuit of the NH amplifier.

The equivalent circuit, simplified by the diagram, which is obtained in this manner is shown in Figure 11, in which 23 and 24 are the two negative impedances of the amplifiers N and NP respectively, taken individually.

In Figure 12, there is shown the diagram of a type NH amplifier consisting of a type N triode amplifier with cathode output and of a type NP triode amplifier with negative feedback current.

Although the present invention has been shown and described with reference to a specific embodiment, nevertheless various changes and modifications such as are obvious to one skilled in this art are deemed to be within the spirit, scope, and contemplation of the present invention.

What is claimed is:

1. A negative impedance amplifier adapted to be connected into parallel lines comprising a first input transformer, a first output transformer, the input of said first input transformer and the output of the said first output transformer being connected in series with at least one of said lines, a first thermionic tube circuit having an input, an output, an impedance in the grid circuit and a negative feedback, the output from said first input transformer being applied to said input of said first thermionic tube circuit, said output from said first thermionic tube circuit being applied to the input of said first output transformer, a second input transformer, a second output transformer, the input of said second input transformer and the output of said second output transformer being connected in parallel across said lines, a second thermionic tube circuit having an input, an output, an impedance connected in the grid circuit and a negative feedback, the output from said second input transformer being applied to said input of said second thermionic tube circuit, said output from said second thermionic tube circuit being applied to the input of said second output transformer.

2. An amplifier according to claim 1 in which the input of said first input transformer and the output of said first output transformer are connected to be balanced and symmetrical with respect to both of said lines, said first output transformer having a winding in series with each line, said second input transformer and said second output transformer are connected across said lines from the center taps of said two windings of said first output transformer.

3. An impedance converter adapted to convert the impedance of a two-terminal network by multiplying it by a dimensionless number and inverting its sign, comprising: a first terminal, a second terminal, a first audio-frequency transformer, the input of said first transformer being connected between said first and second terminals; a second transformer and a negative feedback amplifier circuit having a cathode output and an equivalent negative feedback, the output of said amplifier being connected to said second transformer input, circuit means comprising a passive impedance connecting the output of said first transformer to the input of said amplifier, the said second transformer output being connected between said first and second terminals in series with the said first transformer input and in such a direction as to provide an output voltage in opposition of phase with the voltage which is produced at the first transformer input by a given current circulating on the line, said amplifier circuit and the transformation ratios of said first and second transformers being such to induce an output voltage of said second transformer higher than the voltage produced between the input terminals of said first transformer by said given current circulating on the line, the input impedance of the amplifier circuit being substantially infinite and the phase constants of said first and second transformers and of said amplifier circuit being substantially null or multiple of 180° in the whole telephone audio-frequency band, and the output resistance of the cathode output and the transformation ratio of said second transformer being such as to produce a corresponding resistance on the line substantially negligible with respect to the impedance equivalent to the voltage appearing at the output of said second transformer in relation to the passage on the line of said given current.

4. An impedance converter according to claim 3 wherein said amplifier circuit consists simply of a triode tube having a cathode output.

5. An impedance converter as recited in claim 3 adapted to convert the impedance of a two terminal network by multiplying it by a dimensionless number and inverting its sign; wherein said passive impedance consists of said two terminal network.

6. An impedance converter as recited in claim 3 adapted to convert the attenuation of a constant impedance four-terminal network into an impedance function equal to the transmission function times a constant; wherein said passive impedance consists of said four-terminal network.

7. An impedance converter comprising; a first terminal, a second terminal, a first audio-frequency transformer, two purely ohmic high resistances, each of them being connected between one of said terminals and an imput terminal of said first transformer and such as to render substantially constant, under a constant voltage applied to said first and second terminals, the current circulating at the input of said first transformer, a second transformer and an amplifier circuit having a negative current feedback in order to have a high output resistance, the output of said amplifier connected between to the input of said second transformer, circuit means comprising a passive impedance connecting the output of said first transformer to the input of said amplifier, the output winding of said second transformer being connected to said first and second terminals through a condenser connected in series at its center and having a connecting direction such as to produce an output current in phase opposition to a voltage applied between said first and second terminals, said amplifier circuit and the transformer ratios of said first and second transformers being such as to produce an output current much higher than the current which is caused to circulate on the input of said first transformer by the voltage applied between said first and second terminals, the input impedance of said amplifier circuit being substantially infinite and the phase constants of said first and second transformers, including said condensers, and of said amplifier circuit being substantially null at least in the entire telephone audio-frequency band, the output resistance of said amplifier circuit and the transformer ratio of said second transformer being such as to produce a corresponding conductance brought between said first and second terminals which is substantially negligible as compared to the admittance equivalent to the output current of said second transformer in relation to the application of a voltage between said first and second terminals.

8. An impedance converter according to claim 7 wherein the amplifier circuit is formed only by a triode having a negative current feedback obtained by means of a cathode resistance.

9. An impedance converter according to claim 7 adapted to convert the impedance of a given passive two terminal network by taking its reciprocal, multiplying it by a dimensionless number, and inverting its sign; wherein said passive impedance consists of said two-terminal impedance.

10. An impedance converter according to claim 7 adapted to convert the attenuation function of a four-terminal network into an admission function equal to the attenuation function times a constant; wherein said passive impedance consists of said four-terminal network.

References Cited in the file of this patent

UNITED STATES PATENTS

| | | |
|---|---|---|
| 1,334,165 | Pupin et al. | Mar. 16, 1920 |
| 1,863,566 | Dolmage | June 31, 1932 |
| 1,985,353 | Rhodes | Dec. 25, 1934 |